United States Patent
Ma et al.

(10) Patent No.: US 12,356,415 B2
(45) Date of Patent: Jul. 8, 2025

(54) DOWNLINK CONTROL CHANNEL MONITORING METHOD AND APPARATUS

(71) Applicant: HUAWEI TECHNOLOGIES CO., LTD., Guangdong (CN)

(72) Inventors: Ruixiang Ma, Shenzhen (CN); Lei Guan, Beijing (CN); Shengyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 693 days.

(21) Appl. No.: 17/499,368

(22) Filed: Oct. 12, 2021

(65) Prior Publication Data

US 2022/0030569 A1    Jan. 27, 2022

Related U.S. Application Data

(63) Continuation of application No. PCT/CN2020/087960, filed on Apr. 30, 2020.

(30) Foreign Application Priority Data

May 3, 2019    (CN) .......................... 201910366502.9

(51) Int. Cl.
  *H04W 72/23*    (2023.01)
  *H04L 1/00*    (2006.01)
  *H04L 5/00*    (2006.01)

(52) U.S. Cl.
  CPC ........... *H04W 72/23* (2023.01); *H04L 1/0038* (2013.01); *H04L 5/0094* (2013.01)

(58) Field of Classification Search
  None
  See application file for complete search history.

(56) References Cited

U.S. PATENT DOCUMENTS

2020/0314678 A1* 10/2020 Lee .................. H04W 72/12
2020/0329461 A1* 10/2020 Yang ................ H04W 72/23
(Continued)

FOREIGN PATENT DOCUMENTS

CN    103457710 A    12/2013
CN    104081851 A    10/2014
(Continued)

OTHER PUBLICATIONS

3GPP ETSI TS 138.213 Vers. 16.2.0 (Jul. 2020), 5G, NR; Physical Layer Procedures for Control, (3GPP TS 38.213 version 16.2.0 Release 16), Chapter 10 "UE Procedure for Receiving Control Information" pp. 102-118 (Year: 2020).*

(Continued)

*Primary Examiner* — Jamaal Henson (57) ABSTRACT

Embodiments of this application provide a downlink control channel monitoring method and apparatus. A terminal device sends N groups of blind monitoring capability parameters to a network device. The monitoring capability parameters include: a reference value of an interval between monitoring spans, a reference value of duration of a monitoring span, and a reference value of a monitoring capability in the monitoring span. The terminal device determines K monitoring spans in a slot based on the N groups of monitoring capability parameters, and allocates a monitoring capability of the terminal device to the K monitoring spans based on the N groups of monitoring capability parameters. The terminal device may further perform blind detection on a downlink control channel in the K monitoring spans based on monitoring capabilities in the K monitoring spans.

17 Claims, 6 Drawing Sheets

(56) References Cited

U.S. PATENT DOCUMENTS

| | | | |
|---|---|---|---|
| 2021/0282120 A1* | 9/2021 | Salah | H04L 5/0098 |
| 2021/0337378 A1* | 10/2021 | Hosseini | H04L 5/0094 |
| 2023/0033872 A1* | 2/2023 | Oteri | H04L 5/001 |
| 2023/0379938 A1* | 11/2023 | Li | H04W 72/232 |

FOREIGN PATENT DOCUMENTS

| | | |
|---|---|---|
| CN | 105897373 A | 8/2016 |
| CN | 108781133 A | 11/2018 |
| WO | 2017061939 A1 | 4/2017 |
| WO | 2018184490 A1 | 10/2018 |
| WO | 2019029665 A1 | 2/2019 |

OTHER PUBLICATIONS

3GPP ETSI TS 138.213 Vers. (Jul. 2020), 5G, Nr; Physical Layer Procedure for Control, (3GPP TS 38.213 version 16.2.0 Release 16), Chapter 10 "UE Procedure for Receiving Control Information" pp. 102-118 (Year: 2020).*

Huawei: "Summary of 7.2.6.1 PDCCH enhancements", 3GPP Draft; R1-1905656, Apr. 9, 2019, XP051707715, total 55 pages.

3GPP TSG RAN WG1 Meeting #96bis, R1-1905876:"Summary of 7.2.6.1 PDCCH enhancements", Huawei,Xi an, China, Apr. 8, 12, 2019, total 73 pages.

Huawei et al., "PDCCH Enhancements for URLLC", 3GPP TSG RAN WG1 Meeting #97 R1-1906057, May 4, 2019, total 11 pages.

3GPP TS 38.101-1 V15.5.0:"3rd Generation Partnership Project; Technical Specification Group Radio Access Network; NR; User Equipment (UE) radio transmission and reception; Part 1: Range 1 Standalone(Release 15)",Mar. 2019, total 239 pages.

Huawei, "Summary of 7.2.6.1 PDCCH Enhancements", 3GPP TSG RAN WG1 Meeting #96bis R1-1905740,Apr. 15, 2019, total 60 pages.

3GPP TS 38.211 V15.5.0:"3rd Generation Partnership Project; Technical Specification Group Radio Access Network; NR;Physical channels and modulation(Release 15)",Mar. 2019, total 96 pages.

VIVO, "PDCCH Enhancements for URLLC", 3GPP TSG RAN WG1 #97 R1-1906146, May 1, 2019, total 8 pages.

3GPP TS 38.212 V15.5.0:"3rd Generation Partnership Project; Technical Specification Group Radio Access Network; NR;Multiplexing and channel coding(Release 15)",Mar. 2019, total 101 pages.

3GPP TS 38.213 V15.5.0 :"3rd Generation Partnership Project; Technical Specification Group Radio Access Network; NR;Physical layer procedures for control(Release 15)",Mar. 2019, total 104 pages.

3GPP TS 38.214 V15.5.0:"3rd Generation Partnership Project; Technical Specification Group Radio Access Network; NR;Physical layer procedures for data(Release 15)",Mar. 2019, total 103 pages.

3GPP TS 38.300 V15.5.0:"3rd Generation Partnership Project; Technical Specification Group Radio Access Network; NR; NR and NG-RAN Overall Description; Stage 2(Release 15)",Mar. 2019, total 98 pages.

3GPP TS 38.321 V15.5.0: 3rd Generation Partnership Project; Technical Specification Group Radio Access Network; NR; Medium Access Control (MAC) protocol specification(Release 15) Mar. 2019, total 78 pages.

3GPP TS 38.322 V15.5.0 3rd Generation Partnership Project; Technical Specification Group Radio Access Network: NR;Radio Link Control (RLC) protocol specification(Release 15) Mar. 2019, total 33 pages.

3GPP TS 38.331 V15.5.1 3rd Generation Partnership Project; Technical Specification Group Radio Access Network; NR;Radio Resource Control (RRC) protocol specification(Release 15) Apr. 2019 total 491 pages.

* cited by examiner

S1010: Select a reference value of a monitoring capability in a monitoring time window in one group of monitoring capability parameters as a monitoring capability in each monitoring time window

DOWNLINK CONTROL CHANNEL MONITORING METHOD AND APPARATUS

CROSS-REFERENCE TO RELATED APPLICATIONS

This application is a continuation of International Application No. PCT/CN2020/087960, filed on Apr. 30, 2020, which claims priority to Chinese Patent Application No. 201910366502.9, filed on May 3, 2019. The disclosures of the aforementioned applications are hereby incorporated by reference in their entireties.

TECHNICAL FIELD

Embodiments of this application relate to the field of wireless communications, and in particular, to a downlink control channel monitoring method and an apparatus.

BACKGROUND

In New Radio (NR) of a 5th generation (5G) mobile communications system defined in a 3rd Generation Partnership Project, a network device sends a physical downlink control channel (PDCCH) to a terminal device. The PDCCH carries downlink control information (DCI) to indicate information such as a time-frequency resource of a physical downlink shared channel (PDSCH) or a physical uplink shared channel (PUSCH). However, the terminal device does not know a specific time-frequency resource used by the network device to send the PDCCH, and needs to perform blind detection on the PDCCH at a possible time-frequency resource location.

SUMMARY

This application provides a downlink control channel monitoring method and an apparatus, to fully use a monitoring capability of a terminal device to reduce a data transmission delay while a maximum monitoring capability of the terminal device is not exceeded.

According to a first aspect, this application provides a downlink control channel monitoring method. The method may be executed by a terminal device, or may be applied to a module (for example, a chip) of a terminal device. The terminal device sends first indication information to a network device. The first indication information indicates N groups of monitoring capability parameters of the terminal device. Each group of monitoring capability parameters in the N groups of monitoring capability parameters include at least one of the following parameters: a reference value of an interval between monitoring spans, a reference value of duration of a monitoring span, and a reference value of a monitoring capability in the monitoring span, where N is a positive integer. The monitoring capability includes a maximum quantity of candidate downlink control channels and/or a maximum quantity of non-overlapping control channel elements. The terminal device determines K monitoring spans in a first time unit based on reference values of intervals between monitoring spans and/or reference values of duration of monitoring spans in the N groups of monitoring capability parameters, where K is a positive integer. The terminal device determines monitoring capabilities in the K monitoring spans based on reference values of monitoring capabilities in monitoring spans in the N groups of monitoring capability parameters. The terminal device performs blind detection on a downlink control channel in the K monitoring spans based on the monitoring capabilities in the K monitoring spans.

According to a second aspect, this application provides a downlink control channel sending method. The method may be executed by a network device, or may be applied to a module (for example, a chip) of a network device. The network device receives first indication information from a terminal device. The first indication information indicates N groups of monitoring capability parameters of the terminal device. Each group of monitoring capability parameters in the N groups of monitoring capability parameters include at least one of the following parameters: a reference value of an interval between monitoring spans, a reference value of duration of a monitoring span, and a reference value of a monitoring capability in the monitoring span, where N is a positive integer. The monitoring capability includes a maximum quantity of candidate downlink control channels and/or a maximum quantity of non-overlapping control channel elements. The network device determines K monitoring spans in a first time unit based on reference values of intervals between monitoring spans and/or reference values of duration of monitoring spans in the N groups of monitoring capability parameters, where K is a positive integer. The network device determines monitoring capabilities in the K monitoring spans based on reference values of monitoring capabilities in monitoring spans in the N groups of monitoring capability parameters. The network device sends a downlink control channel on a time-frequency resource of a candidate downlink control channel in the K monitoring spans.

In a possible implementation of the first aspect or the second aspect, the determining monitoring capabilities in the K monitoring spans based on reference values of monitoring capabilities in monitoring spans in the N groups of monitoring capability parameters includes: a monitoring capability in each of the K monitoring spans is a minimum value of the reference values of the monitoring capabilities in the monitoring spans in the N groups of monitoring capability parameters, or a monitoring capability in each of the K monitoring spans is a maximum value of the reference values of the monitoring capabilities in the monitoring spans in the N groups of monitoring capability parameters, or a monitoring capability in each of the K monitoring spans is a reference value of a monitoring capability in a monitoring span in a first monitoring capability parameter group, where the first monitoring capability parameter group is a group that is in the N groups of monitoring capability parameters and that has a smallest reference value of duration of a monitoring span, or a monitoring capability in each of the K monitoring spans is a reference value of a monitoring capability in a monitoring span in a second monitoring capability parameter group, where the second monitoring capability parameter group is a group that is in the N groups of monitoring capability parameters and that has a largest reference value of an interval between monitoring spans.

In a possible implementation of the first aspect or the second aspect, the first monitoring capability parameter group is the group that is of the N groups of monitoring capability parameters and that has a smallest reference value of duration of a monitoring span. When reference values of duration of monitoring spans in N1 of the N groups of monitoring capability parameters are equal and the smallest, a reference value of an interval between monitoring spans in the first monitoring capability parameter group is greater than reference values of intervals between monitoring spans in other N1-1 groups of monitoring capability parameters, where N1 is an integer greater than one.

In a possible implementation of the first aspect or the second aspect, the second monitoring capability parameter group is the group that is of the N groups of monitoring capability parameters and that has a largest reference value of an interval between monitoring spans. When reference values of intervals between monitoring spans in N2 of the N groups of monitoring capability parameters are equal and the largest, a reference value of duration of a monitoring span in the second monitoring capability parameter group is less than reference values of duration of monitoring spans in other N2-1 groups of monitoring capability parameters, where N2 is an integer greater than one.

In a possible implementation of the first aspect or the second aspect, the determining monitoring capabilities in the K monitoring spans based on reference values of monitoring capabilities in monitoring spans in the N groups of monitoring capability parameters includes: determining a total monitoring capability $C_{total}$ in the first time unit based on the reference values of the monitoring capabilities in the monitoring spans in the N groups of monitoring capability parameters. A monitoring capability in the first monitoring span is $C_{total}-(K-1)*floor(C_{total}/K)$ and a monitoring capability in each of K-1 monitoring spans other than the first monitoring span is $floor(C_{total}/K)$, where floor represents rounding down, and the first monitoring span is the earliest monitoring span of the K monitoring spans.

In a possible implementation of the first aspect or the second aspect, the determining a total monitoring capability $C_{total}$ in the first time unit based on the reference values of the monitoring capabilities in the monitoring spans in the N groups of monitoring capability parameters includes: calculating, based on the N groups of monitoring capability parameters, a monitoring capability that corresponds to each group of monitoring capability parameters in the N groups of monitoring capability parameters and that is in the first time unit; and using a maximum value of monitoring capabilities that correspond to all groups of monitoring capability parameters and that are in the first time unit as the total monitoring capability $C_{total}$ in the first time unit.

In a possible implementation of the first aspect or the second aspect, a start symbol of the first monitoring span is a start symbol of the first time unit, and the first monitoring span is the earliest monitoring span of the K monitoring spans.

In a possible implementation of the first aspect or the second aspect, an interval between a start symbol of an $i^{th}$ monitoring span of the K monitoring spans and a start symbol of an $(i-1)^{th}$ monitoring span of the K monitoring spans is $X_{target}$ symbols, where the $i^{th}$ monitoring span is adjacent to the $(i-1)^{th}$ monitoring span in time.

In a possible implementation of the first aspect or the second aspect, $X_{target}$ is a minimum value of the reference values of the intervals between the monitoring spans in the N groups of monitoring capability parameters, or $X_{target}$ is a maximum value of the reference values of the intervals between the monitoring spans in the N groups of monitoring capability parameters.

In a possible implementation of the first aspect or the second aspect, duration of each of the K monitoring spans is $X_{target}$.

In a possible implementation of the first aspect, the method further includes: receiving second indication information from the network device; and determining T monitoring occasions of a downlink control channel in the first time unit based on the second indication information, where T is a positive integer. The start symbol of the first monitoring span is a start symbol of a first monitoring occasion, the first monitoring span is the earliest monitoring span in the K monitoring spans, and the first monitoring occasion is an earliest monitoring occasion of the T monitoring occasions.

In a possible implementation of the second aspect, the method further includes: determining T monitoring occasions of a downlink control channel in the first time unit based on search space-related information, where T is a positive integer, the start symbol of the first monitoring span is a start symbol of a first monitoring occasion, the first monitoring span is the earliest monitoring span in the K monitoring spans, and the first monitoring occasion is an earliest monitoring occasion of the T monitoring occasions; and sending second indication information to the terminal device, where the second indication information includes the search space-related information.

In a possible implementation of the first aspect or the second aspect, the start symbol of the $i^{th}$ monitoring span of the K monitoring spans is a start symbol of a second monitoring occasion. The second monitoring occasion is an earliest monitoring occasion that is of the T monitoring occasions and whose start symbol is behind the start symbol of the $(i-1)^{th}$ monitoring span of the K monitoring spans, where i is an integer greater than one and less than or equal to K. The $i^{th}$ monitoring span is adjacent to the $(i-1)^{th}$ monitoring span in time, and a time-domain location of the $i^{th}$ monitoring span is behind a time-domain location of the $(i-1)^{th}$ monitoring span.

In a possible implementation of the first aspect or the second aspect, the determining K monitoring spans in a first time unit based on reference values of intervals between monitoring spans and/or reference values of duration of monitoring spans in the N groups of monitoring capability parameters includes: duration of each of the K monitoring spans is a larger value of $Y_{min}$ and $N_{max,sym}$ where $Y_{min}$ is a minimum value of the reference values of the duration of the monitoring spans in the N groups of monitoring capability parameters, and $N_{max,sym}$ is a maximum value of a quantity of symbols in a control resource set supported by the terminal device.

According to a third aspect, a communications apparatus is provided, including functional modules configured to implement the method according to the first aspect or any possible implementation of the first aspect.

According to a fourth aspect, a communications apparatus is provided, including functional modules configured to implement the method according to the second aspect or any possible implementation of the second aspect.

According to a fifth aspect, a communications apparatus is provided, including a processor and an interface circuit. The interface circuit is configured to: receive a signal from a communications apparatus other than the communications apparatus and transmit the signal to the processor, or send a signal from the processor to a communications apparatus other than the communications apparatus. The processor is configured to implement the method according to the first aspect or any possible implementation of the first aspect by using a logic circuit or executing a code instruction.

According to a sixth aspect, a communications apparatus is provided, including a processor and an interface circuit. The interface circuit is configured to: receive a signal from a communications apparatus other than the communications apparatus and transmit the signal to the processor, or send a signal from the processor to a communications apparatus other than the communications apparatus. The processor is configured to implement the method according to the second aspect or any possible implementation of the second aspect by using a logic circuit or executing a code instruction.

According to a seventh aspect, a computer-readable storage medium is provided. The computer-readable storage medium stores a computer program or an instruction. When the computer program or the instruction is executed, the method according to the first aspect or any possible implementation of the first aspect is implemented.

According to an eighth aspect, a computer-readable storage medium is provided. The computer-readable storage medium stores a computer program or an instruction. When the computer program or the instruction is executed, the method according to the second aspect or any possible implementation of the second aspect is implemented.

According to a ninth aspect, a computer program product including an instruction is provided. When the instruction is run, the method according to the first aspect or any possible implementation of the first aspect is implemented.

According to a tenth aspect, a computer program product including an instruction is provided. When the instruction is run, the method according to the second aspect or any possible implementation of the second aspect is implemented.

DESCRIPTION OF EMBODIMENTS

Figure 1:
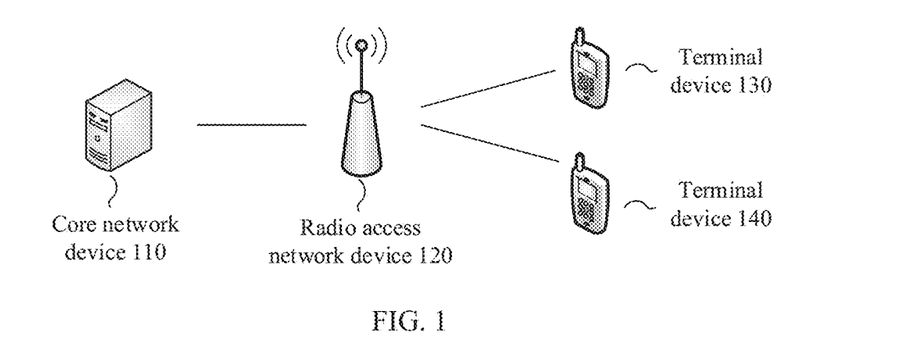
FIG. 1 is a schematic architectural diagram of a mobile communications system applied to an embodiment of this application.

FIG. 1 is a schematic architectural diagram of a mobile communications system applied to an embodiment of this application. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or some functions of the core network device and some functions of the radio access network device may be integrated into one physical device. The terminal device may be at a fixed location or may be movable. FIG. 1 is only a schematic diagram. The communications system may further include another network device, for example, may further include a wireless relay device and a wireless backhaul device, which are not shown in FIG. 1. A quantity of core network devices, a quantity of radio access network devices, and a quantity of terminal devices included in the mobile communications system are not limited in this embodiment of this application.

The radio access network device is an access device that is accessed by the terminal device in a wireless manner and that is in the mobile communications system. The radio access network device may be a base station, an evolved NodeB (eNodeB), a transmission reception point (TRP), a next generation NodeB (gNB) in a 5G mobile communications system, a base station in a future mobile communications system, an access node in a Wi-Fi system, and the like, or may be a module or a unit that performs some functions of a base station, for example, may be a centralized unit (CU) or a distributed unit (DU). A specific technology and a specific device form used by the radio access network device are not limited in this embodiment of this application. In this application, the radio access network device is referred to as a network device for short. Unless otherwise specified, network devices are all radio access network devices.

The terminal device may also be referred to as a terminal, user equipment (UE), a mobile station (MS), a mobile terminal (MT), or the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in a self-driving (autonomous) vehicle, a wireless terminal in remote medical surgery, a wireless terminal in smart grid, a wireless terminal in transportation safety, a wireless terminal in smart city, a wireless terminal in a smart home, and the like. A specific technology and a specific device used by the terminal device are not limited in this embodiment of this application.

The network device and the terminal device may be deployed on land, including an indoor or an outdoor scenario and a handheld or an in-vehicle scenario, or may be deployed on water, or may be deployed on an aircraft, a balloon, and a man-made satellite. Application scenarios of the network device and the terminal device are not limited in the embodiments of this application.

The network device and the terminal device may communicate with each other by using a licensed spectrum, or may communicate with each other by using an unlicensed spectrum, or may communicate with each other by using both a licensed spectrum and an unlicensed spectrum. The network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. A spectrum resource used by the network device and the terminal device is not limited in this embodiment of this application.

In the embodiments of this application, a time-domain symbol may be an orthogonal frequency division multiplexing (OFDM) symbol, or may be a single carrier frequency division multiplexing (SC-FDM) symbol. Unless otherwise specified, symbols in the embodiments of this application are all time-domain symbols.

It may be understood that in the embodiments of this application, a PDSCH, a PDCCH, and a PUSCH are only used as examples of a downlink data channel, a downlink control channel, and an uplink data channel, respectively. In different systems and different scenarios, a data channel and a control channel may have different names. This is not limited in the embodiments of this application.

Before a specific embodiment of this application is described, a process in which a terminal device performs blind detection on a PDCCH is first briefly described.

To enable the terminal device to determine PDCCH monitoring occasions, that is, time-domain locations at which the terminal device performs blind detection on a PDCCH, a network device may configure the following information for the terminal device by using signaling: one or more control resource sets (CORESET), or one or more pieces of search space (SS). Sometimes, search space is also referred to as a search space set, and the two terms are not strictly distinguished in this application. The CORESET includes a frequency-domain location that may be used by the PDCCH and a quantity of time-domain symbols that may be occupied by the PDCCH. The quantity of time-domain symbols may be 1, 2, or 3. Each piece of search space is associated with one CORESET.

Each piece of search space configured by using signaling may include the following information: a search space identifier; an identifier of a CORESET associated with the search space; a type of the search space, for example, common search space (CSS) or UE-specific search space (USS); a period and an offset of the search space, where the period is in a unit of a slot, for example, may be two slots, and the offset refers to a slot in which the search space is located and that is in the period; a specific symbol location of the search space in a slot, where the specific symbol location may be indicated by a bitmap of 14 bits, for example, the bitmap is 10101010101010 and indicates that the terminal device needs to perform blind PDCCH detection at a first, a third, a fifth, a seventh, a ninth, an eleventh, and a thirteenth symbol locations of a slot; and an aggregation level and a quantity of candidate PDCCHs at each aggregation level. A basic unit of a time-frequency resource of a PDCCH is a control channel element (CCE). A quantity of CCEs occupied by a PDCCH is referred to as an aggregation level (AL), and the aggregation level may be 1, 2, 4, 8, or 16. For example, a quantity of candidate PDCCHs at the aggregation level 2 is configured to be 4. To be specific, a PDCCH may be sent at four candidate PDCCH locations, and each candidate PDCCH occupies two CCEs. Correspondingly, the terminal device performs blind detection on the four candidate PDCCHs to determine whether the network device sends a PDCCH at the four candidate locations. It may be understood that in this application, the two terms "monitoring" and "blind detection" may be interchanged unless otherwise specified.

Figure 2:
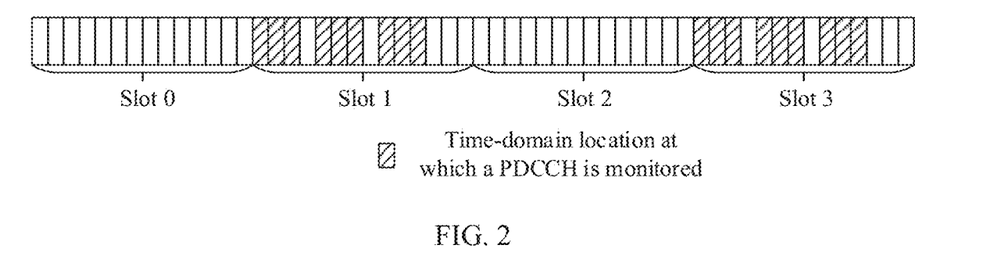
FIG. 2 is a schematic diagram of a time-domain location at which a terminal device monitors a PDCCH according to an embodiment of this application.

The terminal device may determine a PDCCH monitoring occasion based on the foregoing information configured by the network device. For example, the quantity of time-domain symbols of the CORESET is 3, the period of the search space is two slots, the offset is 1, and the bitmap of 14 bits is 10001000100000. In this case, a time-domain location at which the terminal device monitors the PDCCH is shown in FIG. 2. To be specific, the terminal device performs blind detection on the PDCCH in a slot 1 and a slot 3, each slot has three PDCCH monitoring occasions, and each PDCCH monitoring occasion corresponds to three time-domain symbols.

The terminal device may determine, based on the foregoing configurations of the CORESET and the search space, an index of a CCE corresponding to each candidate PDCCH at each aggregation level. For example, it is determined that indexes of CCEs of four candidate PDCCHs at the aggregation level 2 are respectively: indexes of CCEs corresponding to a candidate PDCCH 0 are 0 and 1, indexes of CCEs corresponding to a candidate PDCCH 1 are 2 and 3, indexes of CCEs corresponding to a candidate PDCCH 2 are 4 and 5, and indexes of CCEs corresponding to a candidate PDCCH 3 are 6 and 7.

After determining time-frequency resources of a candidate PDCCH, the terminal device monitors the PDCCH on the time-frequency resources. Only after the terminal device successfully decodes DCI carried on the PDCCH, it indicates that the terminal device successfully monitors the PDCCH. To demodulate and decode the DCI, the terminal device first performs channel estimation on a CCE corresponding to a candidate PDCCH. The channel estimation herein refers to estimating a radio channel on a time-frequency resource corresponding to the CCE. If a same CCE is correspondingly used by a plurality of candidate PDCCHs, a channel estimation result of the CCE may be reused.

A 5G mobile communications system may support an enhanced mobile broadband (eMBB) service, an ultra-reliable and low-latency communications (URLLC) service, and a massive machine-type communications (mMTC) service. A method to reduce data transmission delay of the URLLC service is to configure more monitoring occasions in one slot, so that the network device can schedule data of the URLLC service in time and the terminal device can receive the data of the URLLC service in time. However, if the terminal device monitors the PDCCH on more occasions, the terminal device performs channel estimation and channel decoding for more times, resulting in a needless increase in power consumption of the terminal device. Different terminal devices have different processing capabilities. Therefore, when configuring a parameter related to a PDCCH monitoring occasion for the terminal device, the network device needs to consider the processing capability of the terminal device.

Currently, the processing capability of a terminal device defined in a 3GPP protocol includes: a maximum quantity of candidate PDCCHs that can be blindly detected by the terminal device in one slot and a maximum quantity of non-overlapping CCEs in one slot. Table 1 defines a maximum quantity of candidate PDCCHs that can be blindly detected by the terminal device in each slot of each serving cell. Table 2 defines a maximum quantity of non-overlapping CCEs that can be supported by the terminal device in each slot of each serving cell. The maximum quantity of non-overlapping CCEs is a maximum quantity of CCEs that can be supported by the terminal device for performing channel estimation on the CCEs. In Table 1 and Table 2, $\mu$ indicates that a subcarrier spacing is $2^{\mu} \cdot 0.15$ kilohertz (kHz).

TABLE 1

| $\mu$ | Maximum quantity $M_{PDCCH}^{max,slot}$ of candidate PDCCHs that can be blindly detected by a terminal device in each slot of each serving cell |
|---|---|
| 0 | 44 |
| 1 | 36 |
| 2 | 22 |
| 3 | 20 |

TABLE 2

| $\mu$ | Maximum quantity $C_{PDCCH}^{max,slot}$ of non-overlapping CCEs that can be supported by a terminal device in each slot of each serving cell |
|---|---|
| 0 | 56 |
| 1 | 56 |
| 2 | 48 |
| 3 | 32 |

When performing blind detection on a PDCCH, the terminal device needs to ensure that a quantity of candidate PDCCHs that are blindly detected in one slot does not exceed the monitoring capability of the terminal device defined in Table 1, and a capability of the terminal device to perform channel estimation on non-overlapping CCEs defined in Table 2 is not exceeded either. The terminal device stops blind detection on the PDCCH as long as one of the quantity of candidate PDCCHs that are blindly detected or the quantity of non-overlapping CCEs on which channel estimation is performed reaches an upper limit.

To reduce the data transmission delay of the URLLC service, assuming that the terminal device performs blind detection on a PDCCH once every two symbols, there are seven PDCCH monitoring occasions in one slot. As shown in Table 2, a maximum quantity of CCEs on which the terminal device can perform channel estimation is 56, and therefore one PDCCH monitoring occasion has a maximum of eight CCEs. To perform uplink scheduling and downlink scheduling on the terminal device in time, a PDCCH carrying downlink scheduling information and a PDCCH carrying uplink scheduling information need to be monitored on a PDCCH monitoring occasion. In this case, each PDCCH may use only the aggregation level 4. In many cases, the aggregation level 4 may not be capable of meeting a reliability requirement of PDCCH transmission. Therefore, the maximum quantity of non-overlapping CCEs on the PDCCH monitoring occasion needs to be increased.

It is assumed that in one slot, 12 PDCCH blind detections are allocated to CSS, and the remaining 32 PDCCH blind detections are used for USS. If there are two pieces of USS, each piece of USS has four PDCCH monitoring occasions, and six candidate PDCCHs need to be monitored on each PDCCH monitoring occasion, 24 PDCCH blind detections need to be performed in one piece of USS. If 32 blind detections are preferentially allocated to a first piece of USS, only eight blind detections remain for a second piece of USS. When a quantity of blind detections of the terminal device reaches an upper limit, the terminal device no longer performs blind detection on a PDCCH of the second piece of USS, thereby limiting a scheduling opportunity of the data of the URLLC service and increasing a data transmission delay. Therefore, a quantity of candidate PDCCHs that are blindly detected on a PDCCH monitoring occasion needs to be increased.

To resolve the foregoing problem, a PDCCH monitoring span is introduced, and a monitoring capability in each PDCCH monitoring span is defined.

To avoid that a quantity of PDCCH blind detections that need to be performed by the terminal device exceeds an actual capability of the terminal device because of a parameter (for example, a CORESET and/or search space) that is related to a PDCCH monitoring occasion and that is configured by the network device, the terminal device may send first indication information to the network device, to indicate N groups of monitoring capability parameters of the terminal device, where N is a positive integer. Each group of monitoring capability parameters in the N groups of monitoring capability parameters include at least one of the following parameters: a reference value X of an interval between monitoring spans, a reference value Y of duration of a monitoring span, and a reference value M of a monitoring capability in a monitoring span. That is, each group of parameters may include only one of a reference value X of an interval between monitoring spans, a reference value Y of duration of a monitoring span, and a reference value M of a monitoring capability in a monitoring span, or may include two or all of the foregoing three parameters. As shown in Table 3, each row represents a group of monitoring capability parameters, and M represents a maximum monitoring capability in a monitoring span with an interval of X symbols and duration of Y symbols. The monitoring capability may include: a maximum quantity of non-overlapping CCEs and/or a maximum quantity of candidate PDCCHs.

TABLE 3

| Index | X | Y | M |
|---|---|---|---|
| 1 | 1 | 1 | M1 |
| 2 | 2 | 1 | M2 |
| 3 | 2 | 2 | M3 |
| 4 | 4 | 1 | M4 |
| 5 | 4 | 2 | M5 |
| 6 | 4 | 3 | M6 |
| 7 | 7 | 1 | M7 |
| 8 | 7 | 2 | M8 |
| 9 | 7 | 3 | M9 |

Figure 3:
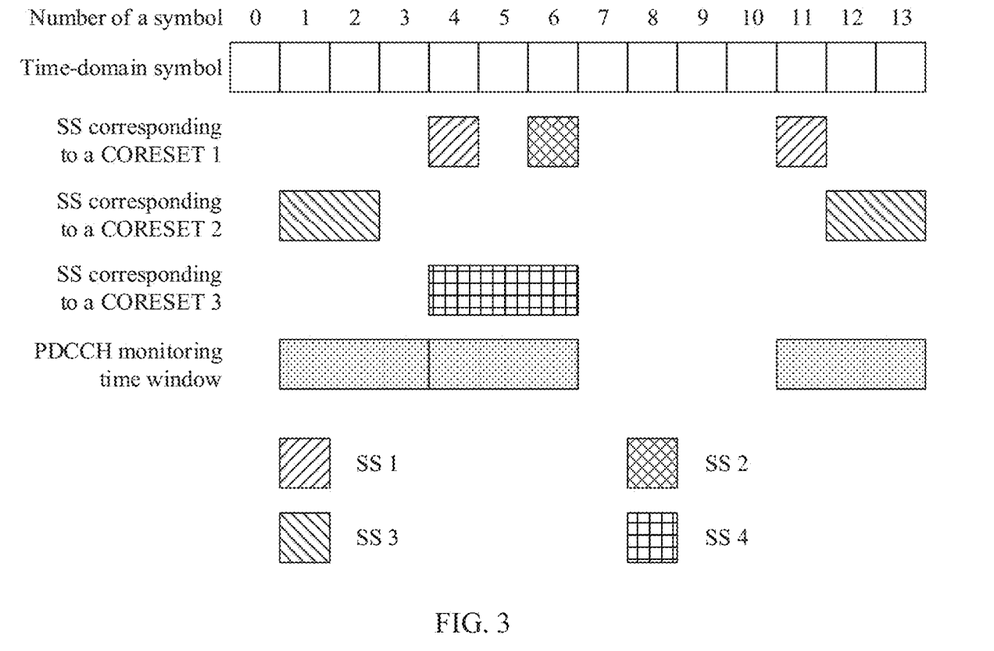
FIG. 3 is a schematic diagram of a relationship among a CORESET, an SS, and a PDCCH monitoring span according to an embodiment of this application.

As shown in FIG. 3, it is assumed that the network device configures three CORESETs for the terminal device: a CORESET 1 of one symbol, a CORESET 2 of two symbols, and a CORESET 3 of three symbols. The CORESET 1 is associated with search space SS 1 and SS 2, the CORESET 2 is associated with SS 3, and the CORESET 3 is associated with SS 4.

Figure 4:
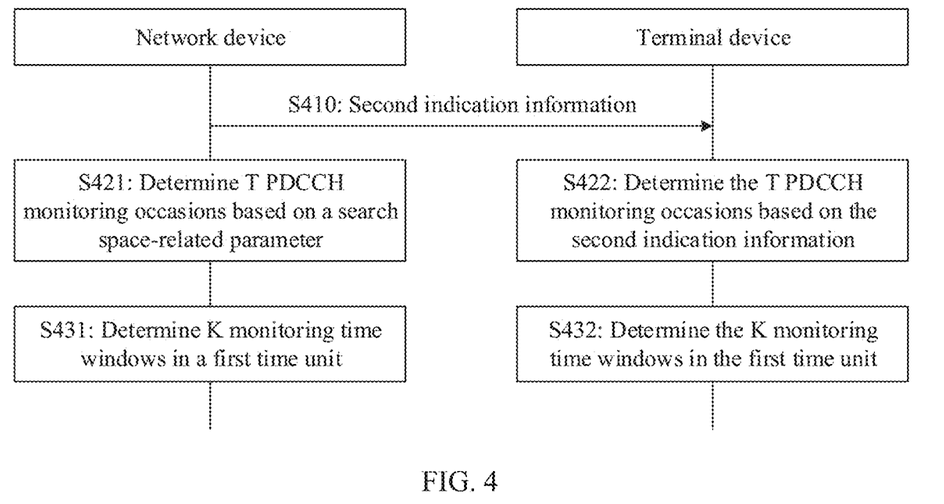
FIG. 4 is a schematic diagram of a method for determining a PDCCH monitoring span according to an embodiment of this application.

A method for determining a PDCCH monitoring span is shown in FIG. 4. The method includes the following steps.

S410: A network device sends second indication information to a terminal device. The second indication information may include a search space-related parameter. Correspondingly, the terminal device receives the second indication information from the network device.

S421: The network device determines T PDCCH monitoring occasions in a first time unit based on the search space-related parameter. The network device sends a PDCCH to the terminal device only on the T monitoring occasions.

S422: The terminal device determines the T PDCCH monitoring occasions in the first time unit based on the second indication information, where T is a positive integer. The first time unit may be a slot, a subframe, or a radio frame. For ease of description, an example in which the first time unit is a slot is used below for description.

S431: The network device determines K monitoring spans in the first time unit based on reference values of intervals between monitoring spans and/or reference values of duration of monitoring spans in N groups of monitoring capability parameters, where K is a positive integer.

S432: The terminal device determines the K monitoring spans in the first time unit based on the reference values of the intervals between the monitoring spans and/or the reference values of the duration of the monitoring spans in the N groups of monitoring capability parameters.

A start symbol of the first monitoring span is a start symbol of a first monitoring occasion, the first monitoring span is the earliest monitoring span in the K monitoring spans, and the first monitoring occasion is an earliest monitoring occasion of the T monitoring occasions. The start symbol of the first monitoring span is defined in such a method that a PDCCH monitoring span starts to be calculated only when there is a PDCCH monitoring occasion, and a monitoring capability is allocated to a symbol corresponding to a PDCCH monitoring occasion, so that a monitoring capability of the terminal device can be used to a maximum extent. It may be understood that in this application, the start symbol is the first symbol.

A start symbol of an $i^{th}$ monitoring span of the K monitoring spans is a start symbol of a second monitoring occasion. The second monitoring occasion is an earliest monitoring occasion that is of the T monitoring occasions and whose start symbol is behind a start symbol of an $(i-1)^{th}$ monitoring span of the K monitoring spans, where i is an integer greater than one and less than or equal to K. The $i^{th}$ monitoring span is adjacent to the $(i-1)^{th}$ monitoring span in time. That the $i^{th}$ monitoring span is adjacent to the $(i-1)^{th}$ monitoring span in time means that there is no other monitoring span between the $i^{th}$ monitoring span and the $(i-1)^{th}$ monitoring span. Optionally, a time-domain location of the $i^{th}$ monitoring span is behind a time-domain location of the $(i-1)^{th}$ monitoring span. In this application, an interval between monitoring spans is an interval between start symbols of two monitoring spans that are adjacent in time. For example, an interval between the start symbol of the $i^{th}$ monitoring span and the start symbol of the $(i-1)^{th}$ monitoring span herein may be referred to as an interval between the $i^{th}$ monitoring span and the $(i-1)^{th}$ monitoring span for short.

Duration of each of the K monitoring spans is a larger value of $Y_{min}$ and $N_{max,sym}$, where $Y_{min}$ is a minimum value of the reference values of the duration of the monitoring spans in the N groups of monitoring capability parameters, and $N_{max,sym}$ is a maximum value of a quantity of symbols in a CORESET configured by the network device by using signaling. In this method, a PDCCH monitoring span may include a complete CORESET, so that the monitoring capability of the terminal device is used to the maximum extent.

After a start symbol of the last PDCCH monitoring span in the first time unit is determined, if a sum of the start symbol and a determined length of duration of the PDCCH monitoring span results in that the monitoring span crosses the boundary of the first time unit, the monitoring span lasts from the start symbol to an end symbol of the first time unit.

It is assumed that the terminal device receives the configuration of the CORESET and the configuration of the search space shown in FIG. 3, and reports, to the network device by using the first indication information, three groups of monitoring capability parameters whose indexes are 3, 6, and 9 shown in Table 3, that is, N is equal to 3. The corresponding three groups of monitoring capability parameters (X, Y, M) are (2, 2, M3), (4, 3, M6), and (7, 3, M9). If the method for determining a PDCCH monitoring span shown in FIG. 4 is applied, $Y_{min}$ is equal to two, $N_{max,sym}$ is equal to three, and duration of the PDCCH monitoring span is three symbols. Finally, three PDCCH monitoring spans shown in FIG. 3 are determined: symbols 1 to 3, symbols 4 to 6, and symbols 11 to 13.

Figure 5:
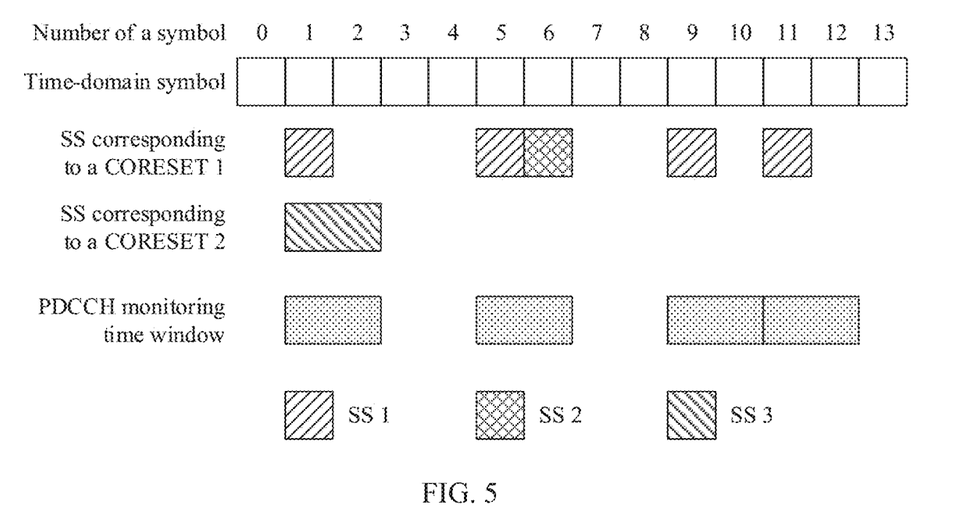
FIG. 5 is a schematic diagram of a relationship among a CORESET, an SS, and a PDCCH monitoring span according to an embodiment of this application.

As shown in FIG. 5, it is assumed that the network device configures two CORESETs for the terminal device by using signaling: a CORESET 1 of one symbol and a CORESET 2 of two symbols. The CORESET 1 is associated with search space SS 1 and SS 2, and the CORESET 2 is associated with SS 3. The terminal device reports, to the network device by using the first indication information, three groups of monitoring capability parameters whose indexes are 3, 6, and 9 shown in Table 3, that is, N is equal to 3. The corresponding three groups of monitoring capability parameters (X, Y, M) are (2, 2, M3), (4, 3, M6), and (7, 3, M9). If the method for determining a PDCCH monitoring span shown in FIG. 4 is applied, $Y_{min}$ is equal to two, $N_{max,sym}$ is equal to two, and duration of the PDCCH monitoring span is two symbols. Finally, four PDCCH monitoring spans shown in FIG. 5 are determined: symbols 1 and 2, symbols 5 and 6, symbols 9 and 10, and symbols 11 and 12.

Figure 6:
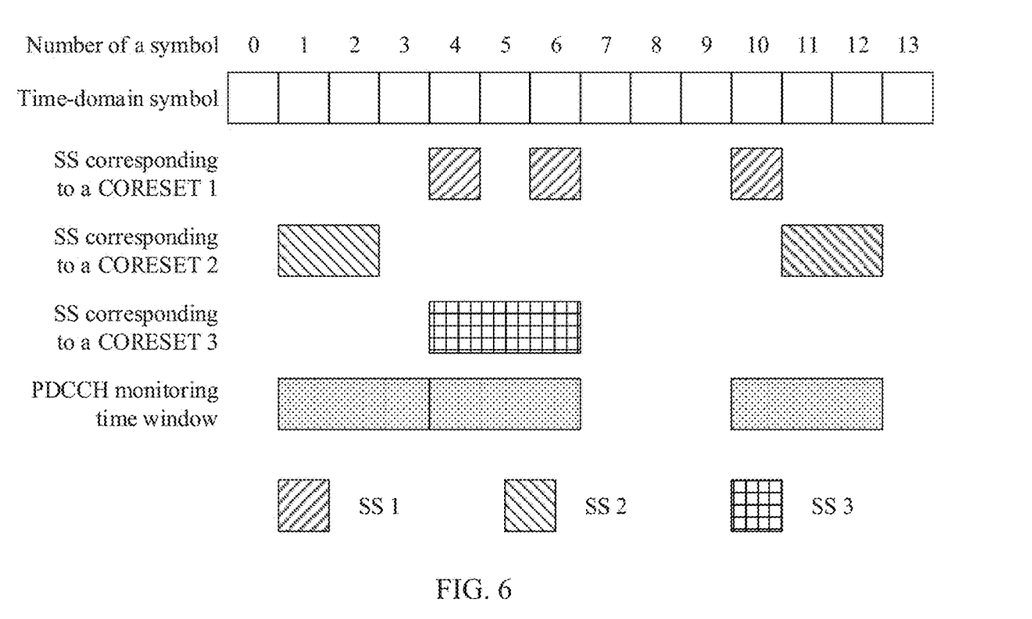
FIG. 6 is a schematic diagram of a relationship among a CORESET, an SS, and a PDCCH monitoring span according to an embodiment of this application.

As shown in FIG. 6, it is assumed that the network device configures three CORESETs for the terminal device by using signaling: a CORESET 1 of one symbol, a CORESET 2 of two symbols, and a CORESET 3 of three symbols. The CORESET 1 is associated with search space SS 1, the CORESET 2 is associated with SS 2, and the CORESET 3 is associated with SS 3. The terminal device reports, to the network device by using the first indication information, three groups of monitoring capability parameters whose indexes are 3, 6, and 9 shown in Table 3, that is, N is equal to 3. The corresponding three groups of monitoring capability parameters (X, Y, M) are (2, 2, M3), (4, 3, M6), and (7, 3, M9). If the method for determining a PDCCH monitoring span shown in FIG. 4 is applied, $Y_{min}$ is equal to two, $N_{max,sym}$ is equal to three, and duration of the PDCCH monitoring span is three symbols. Finally, three PDCCH monitoring spans shown in FIG. 6 are determined: symbols 1 to 3, symbols 4 to 6, and symbols 10 to 12.

Figure 7:
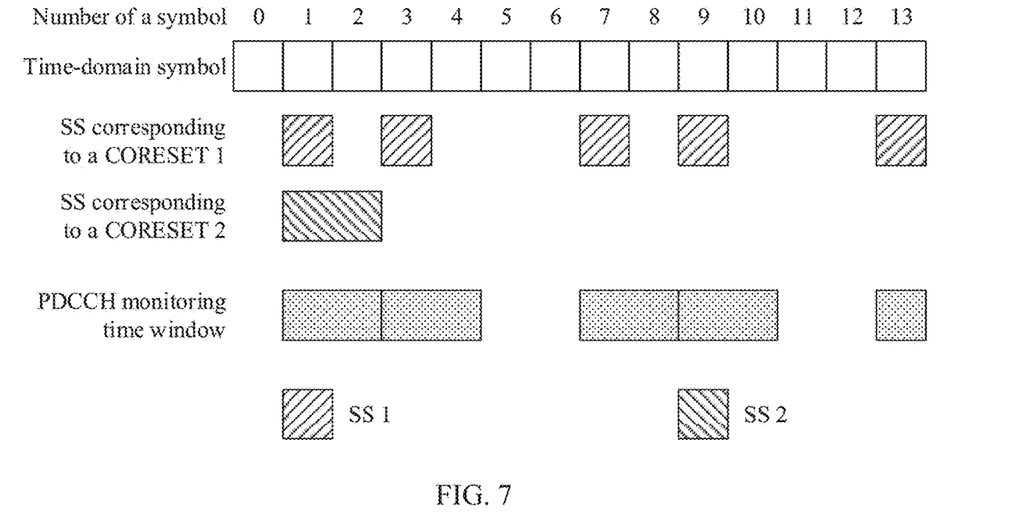
FIG. 7 is a schematic diagram of a relationship among a CORESET, an SS, and a PDCCH monitoring span according to an embodiment of this application.

As shown in FIG. 7, it is assumed that the network device configures two CORESETs for the terminal device by using signaling: a CORESET 1 of one symbol and a CORESET 2 of two symbols. The CORESET 1 is associated with search space SS 1, and the CORESET 2 is associated with SS 2. The terminal device reports, to the network device by using the first indication information, three groups of monitoring capability parameters whose indexes are 3, 4, and 9 shown in Table 3, that is, N is equal to 3. The corresponding three groups of monitoring capability parameters (X, Y, M) are (2, 2, M3), (4, 3, M6), and (7, 3, M9). If the method for determining a PDCCH monitoring span shown in FIG. 4 is applied, $Y_{min}$ is equal to two, $N_{max,sym}$ is equal to two, and duration of the PDCCH monitoring span is two symbols. Finally, five PDCCH monitoring spans shown in FIG. 7 are determined: symbols 1 and 2, symbols 3 and 4, symbols 7 and 8, symbols 9 and 10, and a symbol 13.

Figure 8:
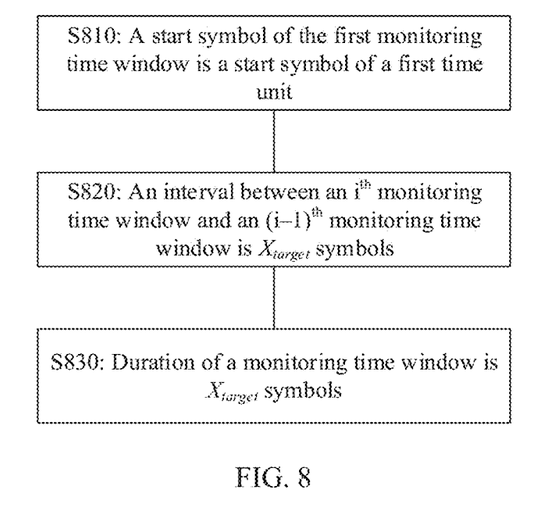
FIG. 8 is a schematic diagram of another method for determining a PDCCH monitoring span according to an embodiment of this application.

FIG. 8 provides another method for determining a PDCCH monitoring span. The method includes the following steps.

S810: A start symbol of the first monitoring span is a start symbol of the first time unit, where the first monitoring span is the earliest monitoring span in the K monitoring spans.

S820: An interval between a start symbol of an $i^{th}$ monitoring span of the K monitoring spans and a start symbol of an $(i-1)^{th}$ monitoring span of the K monitoring spans is $X_{target}$ symbols, where the $i^{th}$ monitoring span is adjacent to the $(i-1)^{th}$ monitoring span in time.

A value of $X_{target}$ may be predefined in a protocol. Alternatively, the value of $X_{target}$ may be configured by the network device for the terminal device by using third indication information.

The value of $X_{target}$ may be a minimum value of reference values X of intervals between monitoring spans in the N groups of monitoring capability parameters. An interval between monitoring spans is determined based on the minimum value of the reference values X of the intervals between the monitoring spans, so that the interval between the monitoring spans can be as small as possible, thereby reducing a PDCCH transmission interval and a transmission delay of service data.

The value of $X_{target}$ may be a maximum value of reference values X of intervals between monitoring spans in the N groups of monitoring capability parameters. An interval between monitoring spans is determined based on the maximum value of the reference values X of the intervals between the monitoring spans, so that a requirement on a monitoring capability of the terminal device can be reduced and therefore power consumption of the terminal device can be reduced.

S830: Duration of each of the K monitoring spans is $X_{target}$.

After a start symbol of the last PDCCH monitoring span in the first time unit is determined, if a sum of the start symbol and a determined length of duration of the PDCCH monitoring span results in that the monitoring span crosses the boundary of the first time unit, the monitoring span lasts from the start symbol to an end symbol of the first time unit.

Figure 9:
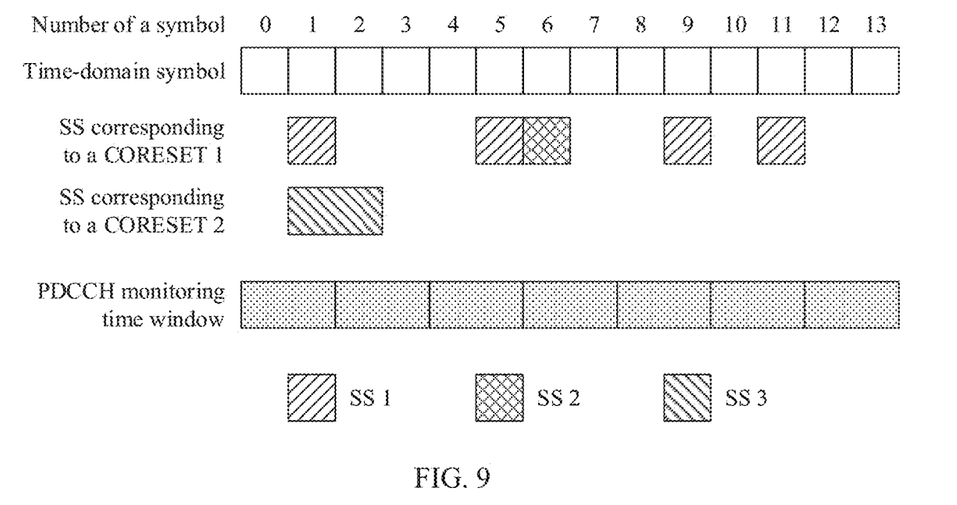
FIG. 9 is a schematic diagram of a relationship among a CORESET, an SS, and a PDCCH monitoring span according to an embodiment of this application.

As shown in FIG. 9, it is assumed that the network device configures two CORESETs for the terminal device by using signaling: a CORESET 1 of one symbol and a CORESET 2 of two symbols. The CORESET 1 is associated with search space SS 1 and SS 2, and the CORESET 2 is associated with SS 3. The terminal device reports, to the network device by using first indication information, three groups of monitoring capability parameters whose indexes are 3, 8, and 9 shown in Table 3, that is, N is equal to 2. The corresponding three groups of monitoring capability parameters (X, Y, M) are (2, 2, M3), (3, 3, M6), and (9, 3, M9). If the method for determining a PDCCH monitoring span shown in FIG. 8 is applied and it is determined that $X_{target}$ is equal to two, an interval between PDCCH monitoring spans and duration of the PDCCH monitoring span are two symbols. Finally, seven PDCCH monitoring spans shown in FIG. 9 are correspondingly determined: symbols 0 and 1, symbols 2 and 3, symbols 4 and 5, symbols 6 and 7, symbols 8 and 9, symbols 10 and 11, and symbols 12 and 13.

After the PDCCH monitoring span is determined, how to further determine a monitoring capability in each PDCCH monitoring span, that is, how to allocate a blind detection capability of the terminal device to each PDCCH monitoring span is a technical problem that needs to be resolved in this embodiment of this application.

Figure 10:
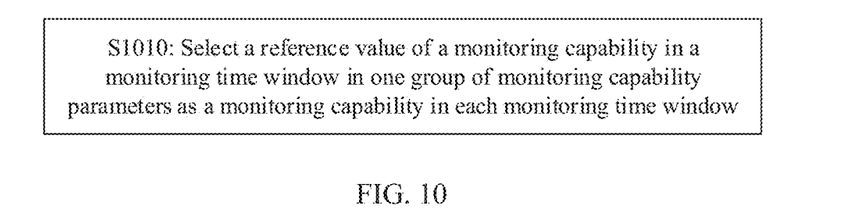
FIG. 10 is a schematic diagram of a method for determining a monitoring capability in a PDCCH monitoring span according to an embodiment of this application.

As shown in FIG. 10, an embodiment of this application provides a method for determining a monitoring capability in a PDCCH monitoring span.

S1010: Select a reference value of a monitoring capability in a monitoring span in one of the N groups of monitoring capability parameters as a monitoring capability in each monitoring span.

A monitoring capability in each of the K monitoring spans is a minimum value of reference values of monitoring capabilities in monitoring spans in the N groups of monitoring capability parameters. The monitoring capability in the PDCCH monitoring span is determined by using the minimum value of the reference values of the monitoring capabilities, so that a requirement on a monitoring capability of the terminal device can be reduced and therefore power consumption of the terminal device can be reduced.

Alternatively, the monitoring capability in each of the K monitoring spans is a maximum value of reference values of monitoring capabilities in monitoring spans in the N groups of monitoring capability parameters. The monitoring capability in the PDCCH monitoring span is determined by using the maximum value of the reference values of the monitoring capabilities, so that a blind detection capability of the terminal device can be used to the maximum extent and a data transmission delay can be reduced.

Alternatively, the monitoring capability in each of the K monitoring spans is a reference value of a monitoring capability in a monitoring span in a first monitoring capability parameter group. The first monitoring capability parameter group is a group that is in the N groups of monitoring capability parameters and that has a smallest reference value of duration of a monitoring span. When reference values of duration of monitoring spans in N1 of the N groups of monitoring capability parameters are equal and the smallest, a reference value of an interval between monitoring spans in the first monitoring capability parameter group is greater than reference values of intervals between monitoring spans in other N1-1 groups of monitoring capability parameters, where N1 is an integer greater than one and less than or equal to N.

Alternatively, the monitoring capability in each of the K monitoring spans is a reference value of a monitoring capability in a monitoring span in a second monitoring capability parameter group. The second monitoring capability parameter group is a group that is in the N groups of monitoring capability parameters and that has a largest reference value of an interval between monitoring spans. When reference values of intervals between monitoring spans in N2 of the N groups of monitoring capability parameters are equal and the largest, a reference value of duration of the monitoring span in the second monitoring capability parameter group is less than reference values of duration of monitoring spans in other N2-1 groups of monitoring capability parameters, where N2 is an integer greater than one and less than or equal to N.

A monitoring capability in a group of parameters that have a smaller reference value of duration is selected as the monitoring capability in the monitoring span, or a monitoring capability in a group of parameters that have a larger interval between monitoring spans is selected as the monitoring capability in the monitoring span, so that a requirement on a monitoring capability of the terminal device can be reduced and power consumption of the terminal device can be reduced.

Figure 11:
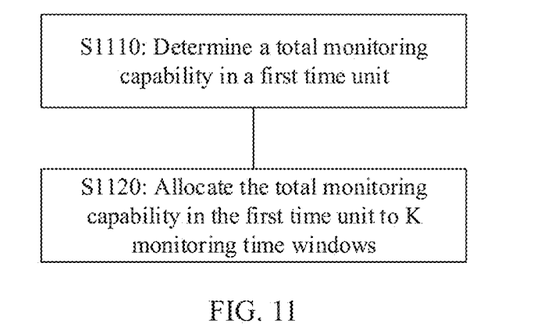
FIG. 11 is a schematic diagram of another method for determining a monitoring capability in a PDCCH monitoring span according to an embodiment of this application.

As shown in FIG. 11, an embodiment of this application provides another method for determining a monitoring capability in a PDCCH monitoring span.

S1110: Determine a total monitoring capability $C_{total}$ in the first time unit based on reference values of monitoring capabilities in monitoring spans in the N groups of monitoring capability parameters. For a process of determining $C_{total}$, refer to S1111 and S1112.

S1111: Calculate, based on the N groups of monitoring capability parameters, a monitoring capability that corresponds to each group of monitoring capability parameters and that is in the first time unit. A monitoring capability C (j) that corresponds to a $j^{th}$ group of monitoring capability parameters and that is in the first time unit may be determined based on a formula (1), a formula (2), or a formula (3). j is a positive integer less than or equal to N, X(j) is a reference value of an interval between monitoring spans in the $j^{th}$ group of monitoring capability parameters, M(j) is a reference value of a monitoring capability in a monitoring span in the $j^{th}$ group of monitoring capability parameters, floor indicates rounding down, and ceil indicates rounding up, where $$C(j) = \text{floor}(N_s/X(j)) * M(j) \quad (1);$$

$$C(j) = \text{ceil}(N_s/X(j)) * M(j) \quad (2); \text{ and}$$

$$C(j) = \text{floor}(((N_s/X(j)) * M(j)) \quad (3).$$

S1112: The total monitoring capability $C_{total}$ in the first time unit may be determined based on a formula (4), where max indicates that a maximum value is obtained:

$$C_{total} = \max\{C(1), \ldots C(j)\} \quad (4)$$

S1120: Allocate the total monitoring capability $C_{total}$ in the first time unit to the K monitoring spans.

There may be the following three monitoring capability allocation methods.

Method 1: The monitoring capability $C_{total}$ is evenly allocated to the K monitoring spans, that is, a monitoring capability in each monitoring span is floor($C_{total}$/K) where floor indicates rounding down.

Method 2: A monitoring capability in each of K−1 monitoring spans in the K monitoring spans other than the first monitoring span is floor($C_{total}$/K), and a monitoring capability in the first monitoring span is $C_{total}$−(K−1)*floor($C_{total}$/K). The first monitoring span is the earliest monitoring span in the K monitoring spans.

Method 3: A monitoring capability in each of K−1 monitoring spans in the K monitoring spans other than a K monitoring span is floor($C_{total}$/K), and a monitoring capability in the $K^{th}$ monitoring span is $C_{total}$−(K−1)*floor($C_{total}$/K). The $K^{th}$ monitoring span is the last monitoring span in the K monitoring spans.

The method for determining a PDCCH monitoring span in FIG. 8 and the methods for determining a monitoring capability in a PDCCH monitoring span in FIG. 10 and FIG. 11 may be executed by a network device, or may be executed by a functional module (for example, a chip) applied to a network device. Alternatively, the methods may be executed by a terminal device, or may be executed by a functional module (for example, a chip) applied to a terminal device.

Figure 12:
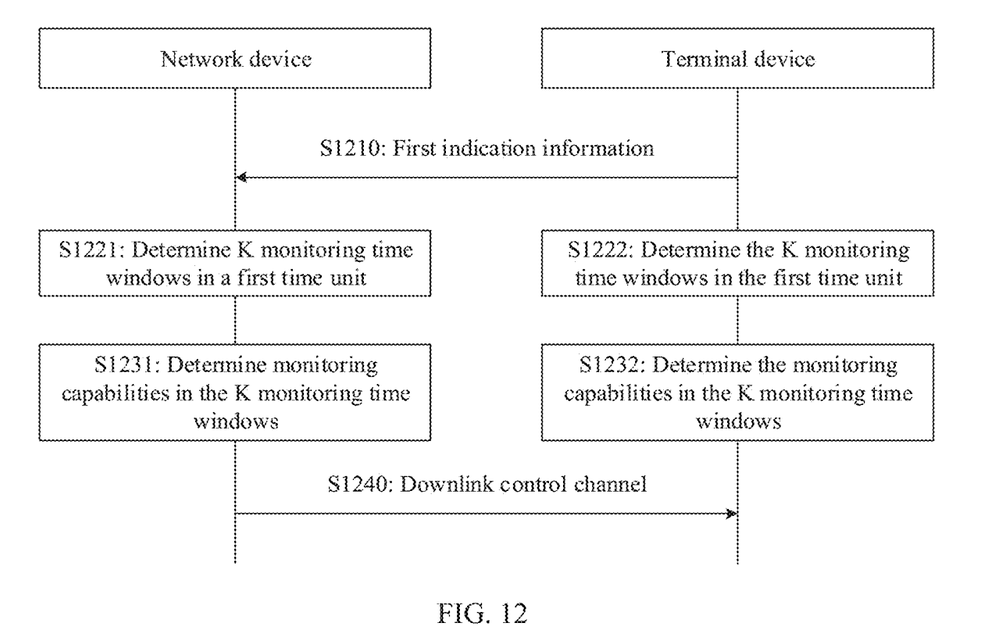
FIG. 12 is a schematic diagram of a downlink control channel sending and monitoring method according to an embodiment of this application.

FIG. 12 provides a processing process of a downlink control channel sending and monitoring method according to an embodiment of this application. A function performed by the network device in the method may also be performed by a functional module (for example, a chip) applied to the network device. A function performed by the terminal device in the method may also be performed by a functional module (for example, a chip) applied to the terminal device. For ease of description, the method is executed by a network device and a terminal device in the following description.

The method includes the following steps.

S1210: The terminal device sends first indication information to a network device. The first indication information indicates N groups of monitoring capability parameters of the terminal device. Each group of monitoring capability parameters in the N groups of monitoring capability parameters include at least one of the following parameters: a reference value of an interval between monitoring spans, a reference value of duration of a monitoring span, and a reference value of a monitoring capability in the monitoring span, where N is a positive integer.

The monitoring capability may include a maximum quantity of candidate downlink control channels and/or a maximum quantity of non-overlapping control channel elements. The maximum quantity of candidate downlink control channels is a maximum quantity of candidate PDCCHs that can be blindly detected by the terminal device in the first time unit. Further, the maximum quantity of candidate PDCCHs may be in one serving cell.

S1221: The network device determines K monitoring spans in a first time unit, where K is a positive integer.

S1222: The terminal device determines the K monitoring spans in the first time unit.

For a method for determining the K monitoring spans in the first time unit by the network device and the terminal device, refer to the methods in FIG. 4 and FIG. 8.

S1231: The network device determines monitoring capabilities in the K monitoring spans based on reference values of monitoring capabilities in monitoring spans in the N groups of monitoring capability parameters.

S1232: The terminal device determines the monitoring capabilities in the K monitoring spans based on the reference values of the monitoring capabilities in the monitoring spans in the N groups of monitoring capability parameters.

For a method for determining the monitoring capabilities in the K monitoring spans by the network device and the terminal device, refer to the methods in FIG. 10 and FIG. 11.

S1240: The network device sends a downlink control channel on a time-frequency resource of a candidate downlink control channel in the K monitoring spans. Correspondingly, the terminal device performs blind detection on the downlink control channel in the K monitoring spans based on the monitoring capabilities in the K monitoring spans.

According to the foregoing method, the monitoring span and the monitoring capability in the monitoring span may be determined, and blind detection is further performed on the downlink control channel based on the monitoring capability. On one hand, a blind detection capability of a terminal device can be fully used, a frequency at which service data is scheduled can be increased, and a transmission delay of the service data can be reduced. On the other hand, this can ensure that a quantity of blind detections of the terminal device does not exceed a maximum capability of the terminal device.

It may be understood that to implement functions in the foregoing embodiments, the network device and the terminal device include corresponding hardware structures and/or software modules for performing various functions. A person skilled in the art should easily be aware that, in combination with units and method steps of the examples described in the embodiments disclosed in this application, this application may be implemented by hardware or a combination of hardware and computer software. Whether a function is performed by hardware or hardware driven by computer software depends on particular application scenarios and design constraints of the technical solutions.

Figure 13:
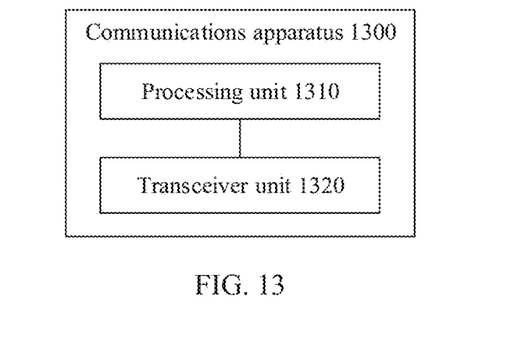
FIG. 13 is a schematic structural diagram of a communications apparatus according to an embodiment of this application.
Figure 14:
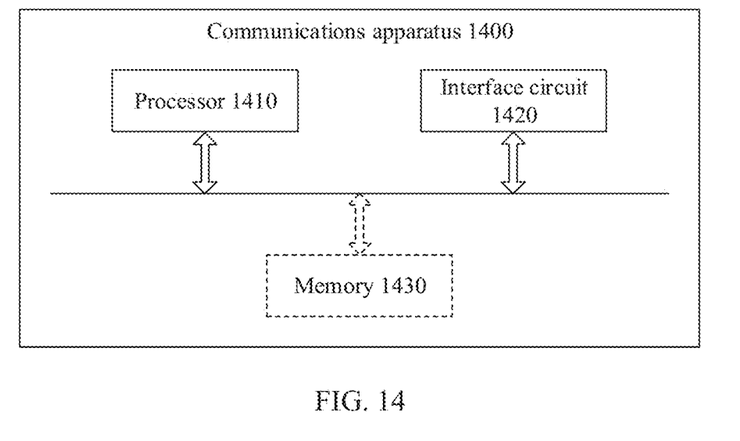
FIG. 14 is a schematic structural diagram of another communications apparatus according to an embodiment of this application.

FIG. 13 and FIG. 14 are schematic structural diagrams of possible communications apparatuses according to embodiments of this application. These communications apparatuses may be configured to implement functions of the terminal device or the network device in the foregoing method embodiments, and therefore may also implement beneficial effects of the foregoing method embodiments. In the embodiments of this application, the communications apparatus may be the terminal device 130 or the terminal device 140 shown in FIG. 1, may be the radio access network device 120 shown in FIG. 1, or may be a module (for example, a chip) applied to a terminal device or a network device.

As shown in FIG. 13, a communications apparatus 1300 includes a processing unit 1310 and a transceiver unit 1320. The communications apparatus 1300 is configured to implement functions of the terminal device or the network device in the method embodiment shown in FIG. 4, FIG. 8, FIG. 10, FIG. 11, or FIG. 12.

When the communications apparatus 1300 is configured to implement a function of the terminal device in the method embodiment shown in FIG. 12, the transceiver unit 1320 is configured to send first indication information to a network device. The first indication information indicates N groups of monitoring capability parameters of the terminal device. Each group of monitoring capability parameters in the N groups of monitoring capability parameters include at least one of the following parameters: a reference value of an interval between monitoring spans, a reference value of duration of a monitoring span, and a reference value of a monitoring capability in the monitoring span, where N is a positive integer. The monitoring capability includes a maximum quantity of candidate downlink control channels and/or a maximum quantity of non-overlapping control channel elements. The processing unit 1310 is configured to determine K monitoring spans in a first time unit based on reference values of intervals between monitoring spans and/or reference values of duration of monitoring spans in the N groups of monitoring capability parameters, where K is a positive integer. The processing unit 1310 is further configured to determine monitoring capabilities in the K monitoring spans based on reference values of monitoring capabilities in monitoring spans in the N groups of monitoring capability parameters. The processing unit 1310 is further configured to perform blind detection on a downlink control channel in the K monitoring spans based on the monitoring capabilities in the K monitoring spans.

When the communications apparatus 1300 is configured to implement a function of the network device in the method embodiment shown in FIG. 12, the transceiver unit 1320 is configured to receive first indication information from a terminal device. The first indication information indicates N groups of monitoring capability parameters of the terminal device. Each group of monitoring capability parameters in the N groups of monitoring capability parameters include at least one of the following parameters: a reference value of an interval between monitoring spans, a reference value of duration of a monitoring span, and a reference value of a monitoring capability in the monitoring span, where N is a positive integer. The monitoring capability includes a maximum quantity of candidate downlink control channels and/or a maximum quantity of non-overlapping control channel elements. The processing unit 1310 is configured to determine K monitoring spans in a first time unit based on reference values of intervals between monitoring spans and/or reference values of duration of monitoring spans in the N groups of monitoring capability parameters, where K is a positive integer. The processing unit 1310 is further configured to determine monitoring capabilities in the K monitoring spans based on reference values of monitoring capabilities in monitoring spans in the N groups of monitoring capability parameters. The transceiver unit 1320 is further configured to send a downlink control channel on a time-frequency resource of a candidate downlink control channel in the K monitoring spans.

For more detailed descriptions of the processing unit 1310 and the transceiver unit 1320, directly refer to related descriptions in the method embodiment shown in FIG. 12. Details are not described herein.

As shown in FIG. 14, a communications apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communications apparatus 1400 may further include a memory 1430, configured to store an instruction executed by the processor 1410, or store input data required by the processor 1410 to run an instruction, or store data generated after the processor 1410 runs an instruction.

When the communications apparatus 1400 is configured to implement the method shown in FIG. 12, the processor 1410 is configured to perform a function of the processing unit 1310, and the interface circuit 1420 is configured to perform a function of the transceiver unit 1320.

When the communications apparatus is a chip applied to a terminal device, the chip of the terminal device implements functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to the network device.

When the communications apparatus is a chip applied to a network device, the chip of the network device implements functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to the terminal device.

It may be understood that the processor in the embodiments of this application may be a central processing unit (CPU), or may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor, or may be any regular processor.

The method steps in the embodiments of this application may be implemented in hardware or may be implemented in software instructions executable by a processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium, and can write information to the storage medium. The storage medium may alternatively be a component of the processor. The processor and the storage medium may be located in the ASIC. In addition, the ASIC may be located in a network device or a terminal device. The processor and the storage medium may alternatively exist in the network device or the terminal device as discrete assemblies.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on the computer, all or some of the procedures or functions according to the embodiments of this application are performed. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

In the embodiments of this application, unless otherwise specified and having a logical conflict, terms and/or descriptions in different embodiments are consistent and may be referenced by each other. Technical features in different embodiments may be combined based on an internal logical relationship thereof to form a new embodiment.

In this application, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. In the literal description of this application, the character "/" generally indicates that a relationship between associated objects is an "or" relationship. In the formula of this application, the character "/" indicates that a relationship between associated objects is a "division" relationship.

It should be understood that various numbers in the embodiments of this application are only for differentiation for ease of description, and are not intended to limit the scope of the embodiments of this application. The sequence numbers of the foregoing processes do not mean execution sequences. The execution sequences of the processes should be determined based on functions and internal logic of the processes.

What is claimed is:

1. A method performed by an apparatus, comprising:
sending first indication information to a network device, the first indication information indicating N groups of monitoring capability parameters of a terminal device, each group of monitoring capability parameters comprising: a reference value of an interval between monitoring spans, and a reference value of a duration of a monitoring span for which N is a positive integer, a monitoring capability comprising at least one of: a maximum quantity of candidate downlink control channels, or a maximum quantity of non-overlapping control channel elements;
determining K monitoring spans in a first time unit based on reference values of intervals between monitoring spans and/or reference values of duration of monitoring spans in the N groups of monitoring capability parameters for which K is a positive integer;
determining monitoring capabilities in the K monitoring spans based on reference values of monitoring capabilities in monitoring spans in the N groups of monitoring capability parameters, wherein a monitoring capability in each of the K monitoring spans is a maximum of the reference values of the monitoring capabilities in the monitoring spans in the N groups of monitoring capability parameters; and
performing blind detection on a downlink control channel in at least one of the K monitoring spans based on the monitoring capabilities in the K monitoring spans.

2. The method according to claim 1, wherein determining the monitoring capabilities in the K monitoring spans comprises:
determining a total monitoring capability $C_{total}$ in the first time unit based on the reference values of the monitoring capabilities in the monitoring spans in the N groups of monitoring capability parameters, wherein monitoring capability in the first monitoring span of the K monitoring spans is $C_{total}-(K-1)*floor(C_{total}/K)$, and a monitoring capability in each of K-1 monitoring spans other than the first monitoring span is floor $(C_{total}/K)$, wherein floor represents rounding down.

3. The method according to claim 2, wherein determining the total monitoring capability $C_{total}$ comprises:
calculating, based on the N groups of monitoring capability parameters, a monitoring capability that corresponds to each group of monitoring capability parameters in the N groups of monitoring capability parameters in the first time unit; and
selecting a maximum value of monitoring capabilities that correspond to all groups of monitoring capability parameters in the first time unit as the total monitoring capability $C_{total}$ in the first time unit.

4. The method according to claim 1, wherein a start symbol of the first monitoring span is a start symbol of the first time unit, and the first monitoring span is the earliest monitoring span in the K monitoring spans.

5. The method according to claim 1, wherein an interval between a start symbol of an $i^{th}$ monitoring span of the K monitoring spans and a start symbol of an (i-1)th monitoring span of the K monitoring spans is $X_{target}$ symbols, wherein the $i^{th}$ monitoring span is adjacent to the (i-1)th monitoring span in a time domain.

6. The method according to claim 5, wherein the $X_{target}$ is one of a minimum value of the reference values of the intervals between the monitoring spans in the N groups of monitoring capability parameters, or a maximum value of the reference values of the intervals between the monitoring spans in the N groups of monitoring capability parameters.

7. An apparatus comprising:
one or more processors; and
a non-transitory computer readable medium storing instructions that, when executed by the one or more processors, cause the apparatus to:
send first indication information to a network device, the first indication information indicating N groups of monitoring capability parameters of a terminal device, each group of monitoring capability parameters comprising: a reference value of an interval between monitoring spans, and a reference value of a duration of a monitoring span, N being a positive integer, a monitoring capability comprising at least one of: a maximum quantity of candidate downlink control channels; or a maximum quantity of non-overlapping control channel elements;
determine at least one of K monitoring spans in a first time unit based on reference values of intervals between monitoring spans and reference values of duration of monitoring spans in the N groups of monitoring capability parameters, where K is a positive integer;
determine monitoring capabilities in the K monitoring spans based on reference values of monitoring capabilities in monitoring spans in the N groups of monitoring capability parameters, wherein a monitoring capability in each of the K monitoring spans is a maximum value of the reference values of the monitoring capabilities in the monitoring spans in the N groups of monitoring capability parameters; and
perform blind detection on a downlink control channel in at least one of the K monitoring spans based on the monitoring capabilities in the K monitoring spans.

8. The apparatus according to claim 7, wherein determining the monitoring capabilities in the K monitoring spans comprises:
determining a total monitoring capability $C_{total}$ in the first time unit based on the reference values of the monitoring capabilities in the monitoring spans in the N groups of monitoring capability parameters, wherein a monitoring capability in the first monitoring span of the K monitoring spans is $C_{total}-(K-1)+\text{floor}(C_{total}/K)$, and a monitoring capability in each of K-1 monitoring spans other than the first monitoring span is floor $(C_{total}/K)$, the floor representing a rounding-down.

9. The apparatus according to claim 8, wherein determining a total monitoring capability $C_{total}$ comprises:
calculating, based on the N groups of monitoring capability parameters, a monitoring capability that corresponds to each group of monitoring capability parameters in the N groups of monitoring capability parameters in the first time unit; and
selecting a maximum value of monitoring capabilities that correspond to all groups of monitoring capability parameters and that are in the first time unit as the total monitoring capability $C_{total}$ in the first time unit.

10. The apparatus according to claim 9, wherein a start symbol of the first monitoring span is a start symbol of the first time unit, and the first monitoring span is the earliest monitoring span in the K monitoring spans.

11. The apparatus according to claim 7, wherein an interval between a start symbol of an $i^{th}$ monitoring span of the K monitoring spans and a start symbol of an (i-1)th monitoring span of the K monitoring spans is $X_{target}$ symbols, wherein the $i^{th}$ monitoring span is adjacent to the (i-1)th monitoring span in a time domain.

12. The apparatus according to claim 11, wherein the $X_{target}$ is one of a minimum value of the reference values of the intervals between the monitoring spans in the N groups of monitoring capability parameters, or a maximum value of the reference values of the intervals between the monitoring spans in the N groups of monitoring capability parameters.

13. A non-transitory computer readable medium storing instructions that, when executed by one or more processors of a terminal device, cause the terminal device to:
send first indication information to a network device, the first indication information indicating N groups of monitoring capability parameters of the terminal device, each group of monitoring capability parameters comprising: a reference value of an interval between monitoring spans, and a reference value of a duration of a monitoring span, N being a positive integer, a monitoring capability comprising at least one of: a maximum quantity of candidate downlink control channels, or a maximum quantity of non-overlapping control channel elements;
determine at least one of K monitoring spans in a first time unit based on reference values of intervals between monitoring spans and reference values of duration of monitoring spans in the N groups of monitoring capability parameters, where K is a positive integer;
determine monitoring capabilities in the K monitoring spans based on reference values of monitoring capabilities in monitoring spans in the N groups of monitoring capability parameters, wherein a monitoring capability in each of the K monitoring spans being a maximum value of the reference values of the monitoring capabilities in the monitoring spans in the N groups of monitoring capability parameters; and
perform blind detection on a downlink control channel in at least one of the K monitoring spans based on the monitoring capabilities in the K monitoring spans.

14. The non-transitory computer readable medium according to claim 13, wherein determining the monitoring capabilities in the K monitoring spans comprises:
determining a total monitoring capability $C_{total}$ in the first time unit based on the reference values of the monitoring capabilities in the monitoring spans in the N groups of monitoring capability parameters, wherein a monitoring capability in the first monitoring span of the K monitoring spans is $C_{total}-(K-1)*\text{floor}(C_{total}/K)$, and a monitoring capability in each of K-1 monitoring spans other than the first monitoring span is floor $(C_{total}/K)$, floor representing rounding down.

15. The non-transitory computer readable medium according to claim 14, wherein determining a total monitoring capability $C_{total}$ comprises:
calculating, based on the N groups of monitoring capability parameters, a monitoring capability that corresponds to each group of monitoring capability parameters in the N groups of monitoring capability parameters and that is in the first time unit; and
selecting a maximum value of monitoring capabilities that correspond to all groups of monitoring capability parameters and that are in the first time unit as the total monitoring capability $C_{total}$ in the first time unit.

16. The non-transitory computer readable medium according to claim 15, wherein a start symbol of the first monitoring span is a start symbol of the first time unit.

17. The non-transitory computer readable medium according to claim 15, wherein an interval between a start symbol of an $i^{th}$ monitoring span of the K monitoring spans and a start symbol of an (i-1)th monitoring span of the K monitoring spans is $X_{target}$ symbols, wherein the $i^{th}$ monitoring span is adjacent to the (i-1)th monitoring span in a time domain.

* * * * *